United States Patent [19]

Pfirrmann

[11] 3,789,056

[45] Jan. 29, 1974

[54] A-PHENYLSUCCINIMIDO-HALO-SULPHONAMIDO-BENZENES

[75] Inventor: Rolf Wilhelm Pfirrmann, Lucerne, Switzerland

[73] Assignee: Ed Geistlich Sohne A.G. fur Chemische Industrie, Wolhusen, Lucerne, Switzerland

[22] Filed: June 17, 1970

[21] Appl. No.: 47,161

[30] Foreign Application Priority Data
June 18, 1969  Great Britain............... 30915/69

[52] U.S. Cl....... 260/239.6, 260/239.7, 260/239.75, 260/239.8, 260/239.9, 260/239.71, 260/268 H, 260/256.5 R, 260/294.8 F, 260/309, 260/326.3, 260/326.5, 424/228, 424/250, 424/251, 424/263, 424/267, 424/273, 424/274

[51] Int. Cl..................... C07d 27/10, A61k 27/00

[58] Field of Search.................................. 260/239.6

[56] References Cited
FOREIGN PATENTS OR APPLICATIONS 6,614,740  4/1967  Netherlands............... 260/239.6
6,717,606  6/1968  Netherlands............... 260/239.6

Primary Examiner—Henry R. Jiles
Assistant Examiner—Cecilia U. S. Jaisle
Attorney, Agent, or Firm—Bacon & Thomas

[57] ABSTRACT

This invention relates to novel compounds of the formula

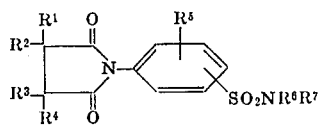

where $R^1$ through $R^7$ are as hereinafter defined, of use in the treatment of Petit Mal and Grand Mal forms of epilepsy.

4 Claims, No Drawings

A-PHENYLSUCCINIMIDO-HALO-SULPHONAMIDO-BENZENES

This invention relates to novel compounds of use in the treatment of epilepsy and to processes for their preparation.

The compound α-ethyl-α-methyl-succinimide has been shown to be effective against the Petit Mal form of epilepsy but it is far less effective against the Grand Mal form and its effective dose level then approaches the toxic dose level. In general, the majority of the available anti-epileptic drugs are active against either Grand Mal or Petit Mal epilepsy but not against both forms.

My copending application Ser. No. 873,741, filed Nov. 26, 1969 and now U.S. Pat. No. 3,574,194, which application is a continuation of my abandoned application Ser. No. 578,462, filed Sept. 12, 1966, and my copending application Ser. No. 692,635, now abandoned in favor of a continuation application Ser. No. 169,063, filed Aug. 4, 1971, describe succinimido benzene sulphonamides having useful anti-convulsant activity. We have now found that those having a halogenated benzene ring have shown particularly good activity and halogenated compounds have shown activity in both the electro-shock and cardiazole-shock tests, indicative of activity against both Grand and Petit Mal forms of epilepsy.

According to the present invention we provide compounds of the general formula

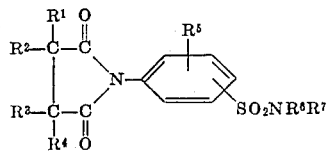

I where $R^1$, $R^2$, $R^3$ and $R^4$, which may be the same or different are hydrogen atoms, aliphatic groups, cycloaliphatic groups or aryl groups or $R^1$ and $R^2$ or $R^3$ and $R^4$ may together represent a cycloalkylidene group, at least one of the substituents $R^1$, $R^2$, $R^3$ and $R^4$ being other than hydrogen;

$R^5$ represents one or more halogen atoms; and $R^6$ and $R^7$, which may be the same or different, are hydrogen atoms, heterocyclic groups, such as pyridyl, pyrimidyl or imidazolyl groups, or aliphatic hydrocarbon groups which may, if desired, carry substituents such as oxo, hydroxyl, carboxyl or esterified carboxyl, or amino or aklylamino groups, or together with the nitrogen atom to which they are attached, form a heterocyclic group, e.g. a piperidyl or piperazyl group; and their salts with bases.

The compound 1-(α-ethyl-α-methyl-succinimido)-2-chloro-5-sulphamoylbenzene is described and claimed in my above mentioned U.S. Pat. No. 3,574,194 and as such is not included within the scope of the present invention.

$R^5$ is either a halogen atom such as bromine, or more preferably fluorine or most advantageously chlorine. Compounds in which the sulphamoyl groups $SO_2NR^6R^7$ is in the 4-position are especially preferred for their good anti-convulsant activity, especially those in which $R^5$ is a chlorine or fluorine atom in the 2-position.

$R^6$ and $R^7$ may, for example, be alkyl groups having 1-5 carbon atoms, i.e. methyl, ethyl, propyl, butyl or amyl groups, acyl groups such as acetyl or benzoyl groups, alkoxycarbonyl groups such as ethoxy carbonyl groups, carbamyl groups e.g. the n-butylaminocarbonyl group, hydroxyalkyl groups, e.g. β-hydroxyethyl, or esterified carboxyalkyl groups e.g. ethoxycarbonylethyl groups. The preferred compounds, however, are those in which $R^6$ and $R^7$ are both hydrogen. The sulphonamido group is preferably in the 4-position relative to the succinimido group.

Where any of $R^1$, $R^2$ $R^3$ and $R^4$ are aliphatic groups they are preferably alkyl or alkenyl groups, advantageously having one to eight carbon atoms, more preferably one to five carbon atoms, for example, methyl, ethyl, propyl, butyl, amyl, hexyl, heptyl or allyl groups, which may carry substituents such as aryl groups, for example phenyl groups, which may be substituted as described below. Such groups may thus include benzyl, phenethyl and phenylallyl groups one or more of $R^1$, $R^2$, $R^3$ and $R^4$ may be a cycloaliphatic group, for example a cycloalkyl or cycloalkenyl or two adjacent groups, i.e. $R^1$ and $R^2$ or $R^3$ and $R^4$, may constitute together a cycloalkylidine group such as a cyclopentylidene or cyclohexylidene group. Cycloalkyl groups may, for example, include cyclopentyl and cyclohexyl groups while cycloalkenyl groups may, for example, include cyclopentenyl and cyclohexenyl groups in which the double bond is in any of the available positions. Such groups in general preferably contain three to eight carbon atoms, advantageously four to seven carbon atoms.

Where one or more of $R^1$, $R^2$, $R^3$ and $R^4$ is aryl, or araliphatic, this may carry one or more alkoxy, methylene dioxy, nitro, cyano, acyl, carboxyl, esterified carboxyl, amino, alkylamino, sulphonamido or acylamido groups or halogen atoms. The phenyl or chlorophenyl group is preferred.

The substituents $R^1$ and $R^2$, may advantageously be a methyl group and a hydrogen atom or ethyl or phenyl group respectively while $R^3$ and $R^4$ are preferably both hydrogen atoms; $R^1$ is also advantageously a phenyl group while $R^2$, $R^3$ and $R^4$ are hydrogen atoms.

The new compounds form salts with bases, for example alkali metal salts e.g. sodium salts or salts with ammonia or amines.

The compound 1-(α-ethyl-α-methyl-succinimido)-2-chloro-4-sulphamoyl-benzene has shown especially favourable properties in our pharmacological tests as compared with 1-(α-ethyl-α-methyl-succinimido)-4-sulphamoylbezene, which is the best compound disclosed in our said earlier cases. The peroral $LD_{50}$ of both compounds is of the order of 4000 mg/kg or greater in mice as compared with α-ethyl-α-methyl-succinimide which has a peroral $LD_{50}$ in mice of about 1500 mg/kg. In the electro-shock test, which is indicative of action against Grand Mal epilepsy, the peroral $ED_{50}$ of 1-(α-ethyl-α-methyl-succinimido)-2-chloro-4-sulphamoylbenzene in mice was as low as 10 mg/kg while in albino rats the corresponding value was 5–10 mg/kg as compared with 5 mg/kg and 25 mg/kg respectively for the non-chlorinated sulphonamide. α-Ethyl-α-methyl-succinimide shows an $ED_{50}$ in the same tests of 500 mg/kg. In the cardiazol shock test, which is indicative of effectiveness against Petit Mal epilepsy, the peroral $ED_{50}$ of 1-(α-ethyl-α-methyl-succinimido)-2-chloro-4-sulphamoyl-benzene was shown to be 50 mg/kg., as against 600 mg/kg for the unchlorinated sulphonamide and 200 – 300 mg/kg. for α-ethyl-α-methyl-succinimide; it will also be noted that the ratio of $ED_{50}/LD_{50}$ is significantly better for the compound according to the invention. This compound showed no sedative activity up to 500 mg/kg.

Table 1 below illustrates the pharmacological results obtained in our experiments in respect of a number of further compounds according to the invention.

| Compound of Example No. | Toxicity: $LD_{50}$ Mice | Antiepileptic Effect $ED_{50}$ | | |
|---|---|---|---|---|
| | | Electro shock. Mice | Rats | Cardiazol Shock. Rats |
| 6 | 5500 | 5-4 | 2.5–1 | 100 |
| 7 | 3500–3600 | 15 | 2.5 | 300–200 |
| 10 | 3800 | 10–7.5 | 2.5-2 | 200 |
| 12 | — | 10 | — | 200 |
| 15 | >7000 | 5 | 2.5-1 | 100 |
| 16 | 7000 | 5 | — | 50 |
| 17 | — | 2.5–10 | — | — |
| 18 | — | 50–25 | — | 200 |
| 26 | — | — | — | 200 |
| 28 | — | 50–25 | — | 20–100 |
| 29 | — | 10 | — | 200 |
| 30 | — | 25 | — | 200 |
| 31 | — | 50 | — | 200 |
| 33 | — | 25 | — | 200 |
| 34 | 7000 | 5–10 | 1 | 200 |
| 38 | — | 25 | 5 | 200 |
| 39 | — | 10 | — | 200 |
| 40 | — | 50–25 | — | 200 |
| 41 | — | 5– 2.5 | — | 200 |

Other compounds according to the invention have similar properties; the particularly preferred products include:

1-(α-methylsuccinimido)-2-chloro-4-sulphamoyl benzene,
1-(α-methyl-succinimido)-2-chloro-5-sulphamoyl benzene,
1-(α-methyl-succinimido)-5-chloro-2-sulphamoyl benzene,
1-(α-methyl-succinimido)-2-fluoro-4-sulphamoyl benzene,
1-(α-methyl-α-succinimido)-2-fluoro-5-sulphamoyl benzene,
1-(α-methyl-α-ethyl-succinimido)-2-chloro-4-sulphamoyl benzene,
1-(α-methyl-α-ethyl-succinimido)-5-chloro-2-sulphamoyl benzene,
1-(α-methyl-α-ethyl-succinimido)-3-fluoro-4-sulphamoyl benzene,
1-(α-methyl-α-ethyl-succinimido)-2-fluoro-4-sulphamoyl benzene,
1-(α-methyl-α-ethyl-succinimido)-3-chloro-4-sulphamoyl benzene,
1-(α-methyl-α-ethyl-succinimido)-2-fluoro-4-(N-ethyl-sulphamoyl)-benzene,
1-(α-cyclohex-1-enyl-succinimido)-2-chloro-4-sulphamoyl-benzene
1-(α-cyclohexyl-succinimido)-2-chloro-4-sulphamoyl-benzene
1-(α,α-cyclohexylidene-succinimido)2-chloro-4-sulphamoyl benzene,
1-(α-cyclohex-2-enyl-succinimido)-2-chloro-4-sulphamoyl-benzene
1-(α-cyclopent-2-enyl-succinimido)-2-chloro-4-sulphamoyl-venzene
1-(α-cyclopentyl-succinimido)-2-chloro-4-sulphamoyl-benzene
1-(α-pentylsuccinimido)-2-chloro-4-sulphamoyl-benzene
1-(α-hexyl-succinimido)-2-chloro-4-sulphamoyl-benzene
1-(α-heptylsuccinimido)-2-chloro-4-sulphamoyl-benzene
1-(α-allyl-succinimido)-2-chloro-4-sulphamoyl-benzene
1-(α-methyl-α-phenyl-succinimido)-2-chloro-4-sulphamoyl benzene,
1-(α-methyl-α-phenyl-succinimido)-2-fluoro-4-sulphamoyl benzene,
1-(α-methyl-α-phenyl-succinimido)-3-fluoro-4-sulphamoyl benzene
1-(α-phenyl-succinimido)-2-chloro-5-sulphamoyl benzene
1-(α-methyl-α-phenyl-succimimido)-3-chloro-4-sulphamoyl-benzene
1-(α-methyl-α-phenyl-succinimido)-2-chloro-5-sulphamoyl-benzene
1-(α-methyl-α-phenyl-succinimido)-2-fluoro-4-(N-acetyl-sulphamoyl)-benzene
1-(α-methyl-α-phenylsuccinimido)-2-fluoro-4-(N-ethyl-sulphamoyl)-benzene
1-(α-phenyl-succinimido)-2-chloro-4-sulphamoyl benzene
1-(α-phenyl-succinimido)-2-fluoro-4-sulphamoyl benzene
1-(α-phenyl-succinimido)-3-fluoro-4-sulphamoyl benzene
1-(α-phenyl-succinimido)-2-fluoro-4-(N-ethylsulphamoyl)-benzene
1-(α-phenyl-succinimido)-2-chloro-4-(N-ethylcarboxyl-sulphamoyl)-benzene
1-(α-phenyl-succinimido)-3,5-dichloro-4-sulphamoyl-benzene
1(α-phenylsuccinimido)-2-chloro-4-(N-acetylsulphamoyl)-benzene
1-(α-phenyl-succinimido-3-chloro-4-sulphamoyl-benzene.

According to a further feature of the invention we provide pharmaceutical compositions containing one or more compounds according to the invention together with one or more pharmaceutical carriers or excipients.

Thus, for example, the compositions may take the form of tablets, coated tablets, capsules, lozenges, suppositories, ampoules for injection, solutions, etc.

The carriers or excipients in such compositions may, for example be those conventional for such forms and may include starch, lactose, magnesium stearate, talc, gelatin, sterile pyrogen-free water, or suspending, emulsifying, dispersing, thickening or flavouring agents.

Dosage units forms such as tablets, capsules, suppositories or ampoules are preferred and advantageously each unit contains 10 to 1000 mg. of active substances, preferably 100 to 300 mg.

The compositions, preferably contain the active substance at a concentration between 0.10 and 80.0% by weight.

According to a still further feature of the invention we provide a process for the preparation of compounds of the general formula I as defined above wherein a compound of the general formula

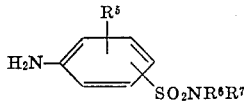

II is reacted with a succinic acid derivative of the general formula $$HOOC - CR^1R^2 - CR^3R^4 - COOH$$

III or a reactive derivative thereof such as anhydride or a mono- or di- ester, e.g. a lower alkyl ester, preferably having one to five carbon atoms, for example a methyl or ethyl ester, where $R^1$, $R^2$, $R^3$, $R^4$, $R^5$, $R^6$ and $R^7$ have the meanings given above, to form the desired succinimido derivative.

The reaction with the free succinic acid, anhydride or ester may be effected in a single stage, or in two stages. In the latter case, the initial product will have the general formula

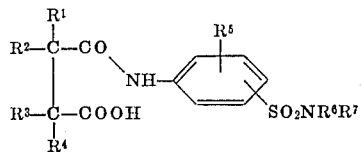

IV (or its isomer in which the hemisuccinyl group is attached by the carbonyl adjacent to the groups $R^3$ and $R^4$) and may be isolated, if desired, before final cyclisation. In general the final condensation requires a reaction temperature of the order of 200°C and for single stage condensations the reaction is preferably carried out between 100° and 200°C. The half-condensation of the succinic acid of formula IV generally takes place within the range 80° – 100°C.

Similarly, the initial condensation to form the product of formula IV is readily effected by merely heating in an inert solvent, e.g. a hydrocarbon, nitrohydrocarbon, chloro-hydrocarbon, ether or cyclic ether solvent. The second stage to effect cyclisation may be effected, for example, in the presence of a dehydrating agent such as an anhydrous salt, e.g. sodium acetate, or sulphuric, phosphoric or polyphosphoric acid or phosphorus pentoxide or simply by heating in the temperature range 100° – 200°C in the absence of a solvent with or without a vacuum.

The reaction time for the reaction with the free acid is preferably one to five hours, advantageously about 2 hours. The one-stage reaction with the anhydride is preferably effected at about 200°C for a short time.

The sulphonamido compounds according to the invention may also be prepared from corresponding compounds lacking a sulphonamido group by reaction with reagents for introducing a sulphonamido group. Thus, for example, a compound of formula I in which R represents an aryl or araliphatic group having no sulphonamido group may be reacted with a sulphonyl halide, to form a halosulphonyl derivative which may then be reacted with ammonia or an amine of the formula NH—$R^6R^7$, where $R^6$ and $R^7$ have the above meanings. It is also possible to introduce an amino group by nitration or by using a nitroaniline in the initial succinimide condensation and to convert this to sulphonyl halide by reduction, diazotisation and treatment with sulphur dioxide in the presence of cuprous halide. Alternatively, a halogenated succinimido-aminobenzene may be prepared by the reaction of the corresponding halogenated aminobenzene derivative with the acid of formula III or a reactive derivative thereof; if necessary the amino group may be protected before reaction.

The compounds of formula I in which one or both of $R^6$ and $R^7$ are hydrogen can be used to prepare derivatives thereof. Thus, for example, acylation gives the acyl derivatives e.g. by reaction with an acyl halide or anhydride; alkylation gives the alkyl derivatives, e.g. by reaction with an alkyl halide, sulphate, sulphonate etc. Hydroxylalkylation gives the hydroxyalkyl derivative, e.g. by reaction with ethylene oxide; carbamylation gives the corresponding urethane, e.g. by reaction with a carbonyl dihalide followed by reaction with ammonia or an amine. Urethane derivatives can be prepared, for example, by reaction with a haloformic acid ester, e.g. a chloroformic acid ester, preferably an alkyl ester having one to five carbon atoms in the alkyl group. Saturated substituents $R^1$ $R^2$, $R^3$ or $R^4$ can be prepared from corresponding unsaturated substituents and thus, for example, an n-propyl substituent can be prepared from an allyl substituent or a cycloalkyl substituent from a cycloalkenyl substituent by reduction, e.g. catalytic hydrogenation, for example using a platinum catalyst.

In order that the invention may be well understood we give the following Examples by way of illustration only (all temperatures are in °C):

Example 1   1-($\alpha$-Methylsuccinimido-2-chloro-4-sulphamoyl benzene

3-Chloro-4-aminobenzene sulphonamide (2.0 g) and $\alpha$-methyl-succinic acid (1.3 g) were heated together in an oil bath at 190° until no further water vapour was given off. The mixture was then cooled, taken up in ethyl acetate, precipitated with a little ether and petroleum ether and allowed to stand a short while. The precipitate was then collected to yield 2.1 g pale beige crystals, m.p. 148°–155°. On recrystallisation from ethyl acetate/petroleum ether (charcoaled), white crystals were obtained, m.p. 175°–176° $C_{11}H_{11}N_2O_4SCl$ requires C 43.68; H 3.66, N 9.27, Cl 11.72; found C 43.98, H 3.80, N 9.12, Cl 11.94%.

Example 2  1-(α-Methylsuccinimido)-2-chloro-5-sulphamoyl-benzene 1-(α-Methylsuccinimido)-2-chlorobenzene (28.4 g) was added with stirring to chlorosulphonic acid (140 ml). The mixture was then heated at 150° for 15 minutes, cooled and added dropwise to ice. The precipitated brown product was collected and dissolved in chloroform to give a deep yellow solution which was dried. Ammonia gas was then introduced. The precipitate was removed and the chloroform solution evaporated to give a viscous oil (16.7 g). The oil was dissolved in ethyl acetate, filtered over charcoal and mixed with petroleum ether. The pale yellow crystals formed, m.p. 176°–178°, were recrystallised from ethyl acetate petroluem ether to give m.p. 178°–180°.

Example 3  1-(α-Methyl-α-ethyl-succinimido)-2-bromo-5-sulphamoyl benzene 1-(α-Methyl-α-ethyl-succinimido)-2-bromobenzene (5.0 g) was added with stirring to chlorosulphonic acid (25 ml) and the mixture heated to 120°C for 15 minutes. The mixture was then cooled, added dropwise to ice (250 g) and the preceipitated product collected. The product was dissolved in chloroform (50 ml) and the solution added dropwise with stirring to concentrated aqueous ammonia (50 ml) and the mixture refluxed for 20 minutes. The mixture was then cooled and evaporated to dryness in vacuo. The residue was stirred with ethyl acetate and water and the ethyl acetate phase evaporated dried and evaporated to give a brown oil (3.2 g). This oil was dissolved in ethyl acetate, filtered over charcoal, and the filtrate mixed with petroleum ether and cooled. The separated product was collected as white crystals m.p. 176°–178°C. $C_{13}H_{15}N_2O_4SBr$ requires C 41.60; H 4.03, N 7.47; found C 41.54, 1+ 4.11, N 7.4%.

Example 4  1-(α-Methyl-ethylsuccinimido)-2-fluoro-5-sulphamoyl benzene 1-(α-Methyl-α-ethyl succinimido)-2-fluorobenzene (10.0 g) and chlorosulphonic acid (50 ml) were mixed with stirring and heated briefly to 140° and then for 10 minutes at 120°. The mixture was then cooled and added dropwise to ice/water and the precipitated product collected. The crude product was dissolved in chloroform and added dropwise to concentrated aqueous ammonia (50 ml). The mixture was stirred at 50° for 15 minutes, cooled and evaporated in vacuo. The residue was taken up in ethyl acetate and water and the ethyl acetate phase separated and shaken with 1N sodium bicarbonate and with 2N hydrochloric acid. The ethyl acetate phase was then dried, charcoaled, concentrated, mixed with petroleum ether and allowed to stand. The precipitated beige crystals, m.p. 110°–115° were recrystallised from ether/petroleum ether and dried in vacuo to give white crystals m.p. 157°–158°. $C_{13}H_{15}N_2O_4SF$ requires C 49.72, H 4.82, N 8.92; C 49.6, H 4.91, N 8.94%.

Example 5  1-(α-Methyl-α-ethyl-succinimido)-2-chloro-4-sulphamoyl benzene

α-Methyl-α-ethylsuccinic anhydride (15.0 g) and 3-chloro-4-aminobenzene sulphonamide (7.5 g) were heated together to an oil bath at 170°–180° for 90 minutes, then at 220° for 30 minutes. The melt was cooled, dissolved in ethyl acetate and shaken with 1N sodium bicarbonate and with 2N hydrochloric acid. The ethyl acetate phase was then dried, charcoaled and mixed with petroleum ether. The mixture on cooling precipitated white crystals (10.0 g) m.p. 175°–176°. $C_{13}H_{15}N_2O_4SCl$ requires C 47.24, H 4.58, N 8.47; found C 47.28, H 4.39, N 8.61%.

Example 6  1-(α-Methyl-α-phenylsuccinimido)-2-fluoro-4-sulphamoyl benzene

3-Fluoro-4-aminobenzenesulphonamide (1.9 g.) and α-methyl-α-phenylsuccinic anhydride (1.9 g.) were heated together for 1 hour at 190°C. The resulting mixture was cooled, dissolved in ethyl acetate and shaken with 2N hydrochloric acid and then with 1N sodium bicarbonate. The ethyl acetate solution was dried, filtered over charcoal and the filtrate evaporated to dryness to give a cloudy oil (3.0 g.). This oil was dissolved in ether, petroleum ether added and the precipitate collected as white crystals of m.p. 125° – 130°C. These were recrystallised from methanol/water to give white crystals, m.p. 150° – 152°C.

$C_{17}H_{15}N_2O_4SF$ requires C 56.40, H 4.18, N 7.74;
$C_{17}H_{15}N_2O_4SF$ found C 56.30, H 4.26, N 7.79%

Example 7 1-(α-Methyl-α-ethylsuccinimido)-2-fluoro-4-sulphamoyl benzene

3-Fluoro-4-aminobenzenesulfonamide (9.4 g.) and α-methyl-α-ethylsuccinic anhydride (7.0 g.) were heated together at 140° to 150°C for 15 minutes. The cooled mixture was dissolved in ethyl acetate and the solution shaken with 2N hydrochloric acid and then with 1N sodium bicarbonate. The solution was dried, evaporated to dryness and the residue treated with petroleum ether to yield light beige crystals (7.5 g. m.p. 139°–144°C). Recrystallisation from ethylacetate/petroleum ether gave white crystals (m.p. 142°–144°C).

$C_{13}H_{15}N_2O_4SF$ requires C 49.72, H 4.82, N 8.92
$C_{13}H_{15}N_2O_4SF$ found C 49.97, H 4.85, N 9.42%.

Example 8  1-α-Methylsuccinimido-5-chloro-2-sulphamoyl benzene

2-Amino-4-chlorobenzenesulphonamide (2.0 g.) and α-methylsuccinic acid (1.3 g.) were heated together at 150°C for 2 hours. The reaction mixture was cooled and dissolved in ethyl acetate. The solution was washed with 2N hydrochloric acid and with 1N sodium bicarbonate, dried and evaporated down to yield a brown oil (2.1 g.) which was dissolved in ether, filtered over charcoal and left to stand overnight. The precipitate was collected as white crystals (m.p. 176° – 182°C.). Recrystallisation from ethyl acetate/petroleum ether gave white crystals (m.p. 184°/188°C).

$C_{11}H_{11}N_2O_4SCl$ requires C 43.68, H 3.66, N 9.27, Cl 11.72
$C_{11}H_{11}N_2O_4SCl$ found C 43.54, H 3.76, N 9.39, Cl 11.66 %

Example 9 1-(α-Methyl-α-ethylsuccinimido)-5-chloro-2-sulphamoylbenzene

2-Amino-4-chlorobenzene sulphonamide (10.3 g.) and α-methyl-α-ethyl-succinic anhydride (7.1 g.) were heated together at 190°C. The mixture was cooled and dissolved in ethyl acetate and shaken with 2N hydrochloric acid and with 1N sodium bicarbonate, dried and filtered over charcoal. The filtrate was mixed with petroleum ether and the precipitate collected as white crystals (6.5 g. m.p. 190°–200°C). Recrystallisation from ethylacetate/petroleum ether gave white crystals m.p. 198°–201°C. $C_{13}H_{15}N_2O_4SCl$ requires C 47.17, H 4.57, N 8.46, Cl 10.71; found C 47.10, H 4.61, N 8.50, Cl 10.82%

Example 10 1-(α-Methyl-α-phenylsuccinimido)-2-chloro-4-sulphamoyl-benzene

3-Chloro-4-aminobenzene sulphonamide (2.0 g.) and α-methyl-α-phenyl succinic anhydride (2.4 g.) were heated together at 210°C for 20 minutes. The cooled mixture was then dissolved in ethyl acetate and shaken with 2N hydrochloric acid and with 1N sodium bicarbonate. The solution was dried and evaporated down to yield a pale yellow cloudy oil (3.0 g.) which was dissolved in ethyl acetate, filtered over charcoal and the filtrate mixed with petroleum ether. The precipitate was collected as white crystals (m.p. 120°–130°C). The crystals were boiled with 2N hydrochloric acid and the insoluble matter collected and dried to give white crystals (m.p. 144°–146°C)

$C_{17}H_{15}N_2O_4SCl$ requires C 53.87, H 3.99, N 7.39; found C 53.80, H 4.07, N 7.44%.

Example 11 1-(α-Methyl-α-phenylsuccinimido)-2-bromo-4-sulphamoyl benzene

3-Bromo-4-anilino benzene sulphonamide (1.25 g.) and α-methyl-α-phenylsuccinic anhydride (0.95 g.) were heated together at 190°C. for 1 hour. The cooled mixture was then dissolved in ethyl acetate, and the solution shaken with 1N sodium bicarbonate and with 2N hydrochloric acid, dried and evaporated down. The residue, a brown oil (2.0 g.), was dissolved in ethyl acetate and charcoal filtered. The filtrate was mixed with petroleum ether, cooled and the precipitate collected as white crystals (m.p. 150°–154°C).

$C_{17}H_{15}N_2O_4SBr$ requires C 48.27, H 3.57, N 6.62; found C 48.06, H 3.54, N 6.91%

Example 12 1-(α-Phenylsuccinimido)-2-bromo-4-sulphamoyl-benzene 2.5 g of 3-bromo-4-aminobenzene-sulphonamide and 1.9 g of phenylsuccinic acid are heated together to 190°C and held at this temperature for 15 minutes. After cooling the mixture is taken up in ethyl acetate and extracted with 1N HCl and NaHCO₃. The ethyl acetate solution is dried with Na₂SO₄, filtered and evaporated to yield 3.8 g of beige crystals which are dissolved in acetone, filtered over charcoal mixed with petroleum ether and cooled and the precipitate suction filtered.

1.5 g of white crystals, m.p. 203°–205°C
Recrystallised with acetone/petroleum ether, m.p. 206°–208°C
Analysis
Calc. C 46.98%; H 3.20%; N 6.85%; Found C 47.27%; H 3.29%; N 6.60%.

Example 13 1-(α-Phenylsuccinimido)-2-chloro-5-sulphamoyl-benzene 5.5 g of 3-amino-4-chlorobenzene-sulphonamide and 5.2 g of phenylsuccinic acid are heated together for 1 hour at 208°C. The mixture is subsequently dissolved in ethyl acetate and extracted with 2N HCl and 1N NaHCO₃. The ethyl acetate solution is dried with Na₂SO₄ and filtered over charcoal. The filtrate is somewhat concentrated, mixed with petroleum ether, cooled and the precipitate suction filtered 6.2 g of white crystals, melting point 186°–188°C. Recrystalized with ethyl acetate/petroleum ether; white crystals, m.p. 186°–187°C
Analysis
Calc. C 52.72%; H 3.59%; N 7.69%; Found C 53.05%; H 3.87%; N 7.40%;

Example 14 1-(α-Methyl-α-ethylsuccinimido)-2-bromo-4-sulphamoylbenzene 2.5 g of 3-bromo-4-aminobenzene sulphonamide and 1.4 g of α-methyl-α-ethylsuccinic anhydride are heated together at 185°C and subsequently held at 170°C. After cooling it is dissolved in ethyl acetate and extracted with 2N HCl and 1N NaHCO₃. The ethyl acetate is dried, filtered over charcoal and evaporated.
0.8 g of yellow oil is taken up in acetone, mixed with petroleum ether, cooled and the precipitate suction filtered.
Beige crystals, m.p. 170°–174°C.
Recrystallised with acetone/ether-petroleum ether, white crystals, m.p. 173°–175°C.
Analysis
Calc. C 41.63%; H 4.03%; N 7.47%; Found C 41.46%; H 4.02%; N 7.51%.

Example 15 1-(α-Phenylsuccinimido)-2-chloro-4sulphamoyl-benzene 2.0 g of 3-chloro-4-aminobenzene sulphonamide and 1.9 g of phenylsuccinic acid were heated together to 220°C, held for 30 minutes at this temperature and then dissolved in ethyl acetate extracted with 2N HCl and 1N NaHCO₃, the ethyl acetate solution being dried with Na₂SO₄, filtered and then evaporated, the residue finally being mixed with ethyl acetate and the insolubles suction filtered.

1.4 g of white crystals m.p. 202°–205°C
Recrystallised with methanol/ether-petroleum ether; white crystals. m.p. 205°–207°C
Analysis
Calc. C 52.65%; H 3.59%; N 7.68%; Found C 52.59%; H 3.73%; N 7.61%.

Example 16 1-(α-Phenylsuccinimido)-2-fluoro-4-sulphamoyl-benzene 1.9 g of 3-fluoro-4-aminobenzene sulphonamide and 2.0 g of phenylsuccinic acid are heated together for 1 hour at 160°C. After cooling, the mixture is dissolved in ethyl acetate and extracted with 2N HCl and 1N NaHCO₃. The ethyl acetate solution is dried over Na₂SO₄, filtered over charocal, concentrated somewhat, mixed with petroleum ether, cooled and the precipitate suction filtered.

1.6 g of white crystals, m.p. 177°–178°C, recrystallised with ethyl acetate; white crystals, m.p. 177°–178°C
Analysis
Calc. C 55.22%; H 3.77%; N 8.05%; Found C 55.30%; H 3.83%; N 7.80%.

Example 17 1-(α-Methylsuccinimido)-2-fluoro-4-sulphamoyl-benzene 1.9 g of 3-fluoro-4-aminobenzene sulphonamide and 1.4 g of methylsuccinic acid are heated together for 1 hour at 160°C. After cooling the melt is dissolved in ethyl acetate and extracted with 2N HCl and 1N NaHCO₃. The ethyl acetate solution is dried with Na₂SO₄, filtered over charcoal, somewhat concentrated and the residue mixed with petroleum ether, cooled and the precipitate suction filtered.

1.3 g of white crystals, m.p.: (168) 176°–177°C
Recrystallised with ethyl acetate/petroleum ether, white crystals, m.p. 176°–177°C.
Analysis
Calc. C 46.19%; H 3.88%; N 9.80%; Found C 45.97%; H 3.99%; N 9.60%.

Example 18 1-(α-Methylsuccinimido)-2-bromo-4-sulphamoyl-benzene 2.5 g of 3-bromo-4-aminobenzene sulphonamide and 1.3 g of methylsuccinic acid are heated together at 180°C and then held for 15 minutes at this temperature. The brown oil is then taken up in ethyl acetate and extracted with 2N HCl and 1N NaHCO₃. The ethyl acetate solution is dried with Na₂SO₄, filtered over charcoal, mixed with petroleum ether and the precipitate suction filtered 1.8 g of beige crystals, m.p. 193°–197°C Recrystallised with acetone/petroleum ether, white crystals. m.p. 203°–205°C Analysis Calc. C 38.07%; H 3.2%; N 8.07%; Found. C 38.34%; H 3.26%; N 7.84%.

Example 19  1-($\alpha$-Phenylsuccinimido)-2-fluoro-4-(N-ethylsulphamoyl)-benzene a. 1-amino-2-fluorobenzene-4-sulphonic acid-N-ethylamide i. 1-acetylamino-2-fluorobenzene-4-sulphonic acid chloride is added dropwise with stirring to excess ethylamine. The reaction solution is evaporated, the product taken up in ethyl acetate, washed with 2N HCl and the ethyl acetate solution evaporated again.

Colourless crystals, m.p. 158°–160°C ii. By saponifying with 20% HCl, boiling under reflux, neutralising with NaOH and filtering off the precipitate, a 70% yield of 1amino-2-fluorobenzene-sulphonic acid-N-ethylamide is obtained; m.p. 80°–83°C.

b. 9.5 g of phenylsuccinic acid 10.0g 1-amino-2-fluorobenzene-4-sulphonic acid-N-ethylamide are heated together in a large boiling vessel for ½ hour at 220°C. After cooling the reaction mixture is dissolved in ethyl acetate and subsequently extracted successively with 2N HCl, 1N sodium bicarbonate solution and water. The ethyl acetate solution is subsequently dried over sodium sulphate and evaporated.

Yield 15.4 g of light yellow oil. The mixture is again dissolved in ethyl acetate, filtered over activated carbon and again evaporated. The same process is repeated. Yield, almost white, solidified foam which did not crystallise. A sample was sent for analysis Calc. C 57.49%; H 4.56%; N 7.45%; Found. C 57.36%; H 4.65%; N 7.24%.

Example 20  1-($\alpha$-Phenylsuccinimido)-2-chloro-4-(N-ethoxy-carbonylsulphamoyl)-benzene 3.6 g of 3-chloro-4-($\alpha$-phenylsuccinimido)-benzene sulphonamide and 36.30 g of potassium carbonate are suspended in 300 ml of acetone and subsequently 1.4 g of ethyl chloroformate is added. The mixture is refluxed for 15 hours, during which the suspension becomes slightly pink. After cooling, the inorganic salts are suction filtered and washed with a little acetone and the mother liquor is evaporated.

Yield: 5 g of slightly pink crystals, very readily soluble in water; this is the potassium salt. The slightly pink crystals are dissolved in a little water, precipitated again with 2N HCl and suction filtered. The substance is then dissolved in ethyl acetate, dried over sodium sulphate and evaporated again.

Yield: 4.6 g of semicrystalline mass which is dissolved in methylene chloride, filtered over activated charcoal, and evaporated to dryness. This purification step was then repeated.

Yield: 1.6 g of colourless crystals, m.p. 78°–84°C. A sample is again filtered over methylene chloride, evaporated and well dried. Despatched for analysis.

Calc. C 52.28%; H 3.39%; N 6.42%; found. C 52.69%; H 4.14%; N 6.00%.

Example 21  1-($\alpha$-Cyclohex-en-1-yl-succinimido)-2-chloro-4-sulphamoyl-benzene (probably associated with some 1-($\alpha,\alpha$-cyclohexylidenesuccinimido)-2-chloro-4-sulphamoyl-benzene)

5.0 g of 2-(cyclohex-en-1-yl)-mono-ethylsuccinate and 4.8 g of 2-chlorosulphanilamide are heated together for 7 hours in a N₂ atmosphere, taken up in 200 ml of ethyl acetate and extracted as follows: (20 ml each) 3 times with 2N HCl, once with water, 3 times with 1N NaHCO₃, once with water, and once with brine. The brine is then back extracted once with 150 ml of ethyl acetate. The combined ethyl acetate phases are subsequently dried over Na₂SO₄, filtered and evaporated. The brown-yellow residue is repeatedly extracted with hot methylene chloride accompanied by shaking. The insoluble product is discarded and the methylene chloride solution filtered through charcoal and evaporated. The 5.0 g of brown resin is shown by thin layer chromatography still to contain a trace of the starting material and is thus taken up in 150 ml of ethyl acetate/hexane 2:1 and extracted as follows: (20 ml each) 6 times with 5 N HCl, once with water, and once with brine. It is dried over Na₂SO₄, filtered and evaporated to yield 2.7 g of yellow solidified foam. Sample for analysis:

Calc: C 52.09%; H 4.64%; Cl 9.62%; N 7.59%; Found: C 52.05%; H 4.75%; Cl 9.79%; N 7.57%.

Example 22  1-($\alpha$-Phenylsuccinimido)-3,5-dichloro-4-sulphamoyl-benzene 12.0 g of 3,5-dichlorosulphanilamide and 9.6 g of phenyl succinic acid are intimately mixed and held for 8 hours in the autoclave at 220°C under N₂. After cooling, the mixture is dissolved in chloroform/ether 1:3 and extracted as follows: 5N HCl, 6 times with 40 ml; water, once with 50 ml; 1N NaHCO₃, 5 times with 50 ml; brine, once with 50 ml. The brine is then back extracted once with 300 ml of chloroform/ether. The combined organic phases are dried over Na₂SO₄, filtered, evaporated in vacuo to yield 11.6 g of brown resin. It is chromatographed on 330 g of silica gel, using chloroform/ether 1:2 as the eluant:

1st fraction 500 ml of dark brown resin — discarded
2nd fraction 1000 ml of yellow resin
3rd fraction 1000 ml of violet oil — discarded The 2nd fraction was decolourised by means of activated charcoal and from crystallised ethyl acetate- hexane to yield 1.1 g; m.p. 164°–170°C. Recrystallisation from ethyl acetate hexane for analysis gave 0.9 g; m.p. 180°–182°C Calc. C 48.18%; H 3.03%; Cl 17.79; N 7.02%; Found. C 48.09%; H 3.10%; Cl 17.61%; N 7.18%.

Example 23  1-($\alpha$-Pentylsuccinimido)-2-chloro-4-sulphamoyl-benzene 1.6 g of pentylsuccinic acid and 1.7 g of 2-chloro-4-sulphonamidoaniline are heated together for 40 minutes at 200°C. The cooled dark brown solid product is dissolved in ether and extracted with 2N HCl and 1N NaHCO₃. The ethereal solution is subsequently washed with water, filtered over activated charcoal, dried over sodium sulphate and evaporated Yield 1.4 g of light yellow oil. Recrystallisation once from ether - petroleum ether Yields 0.95 g of almost white crystals, m.p. 132°–134°C. Subsequent recrystallisation five times from ether - petroleum ether gives crystals of m.p.

135°–139°C Sample of this substance sent for analysis.

Calc. C 50.25%; H 5.34%; N 7.85%; Found. C 50.78%; H 5.46%; N 7.82%.

Example 24 1-(α-Heptylsuccinimido)-2-chloro-4-sulphamoyl-benzene 10.0 g of heptylsuccinic acid and 10.5 g of 2-chloro-4-sulphonamidoaniline heated at 170°C until no more water vapour distils off. The reaction mixture is then dissolved in 300 ml of ethyl acetate and extracted twice with 100 ml each of 2N HCl, 1N NaHCO$_3$ and water. The ethyl acetate solution is dried over sodium sulphate, filtered over activated charcoal and evaporated. Yield 14.8 g of light yellow oil, which is dissolved in 300 ml of ether and again filtered over activated charcoal. The ethereal solution is mixed with petroleum ether and crystallisation is induced by scratching with a glass rod to yield 4.2 g of a white substance of m.p. 122°–125°C. Subsequent recrystallisation 3 times from ether-petroleum ether yields 2.2 g of snow-white crystals; m.p. 124°–127°C. A sample thereof sent for analysis.

Calc. C 52.83%; H 6.00%; N 7.25%; Found. C 52.61%; H 6.07%; N 7.25%.

Example 25 1-(α-Phenylsuccinimido)-2-chloro-4-N-acetyl-sulphamoyl-benzene 7.3 g of 3-chloro-4-(α-phenyl-succinimido)-benzenesulphonamide, 3.2 g of pyridine and 35 ml of acetic anhydride are refluxed together for 2½ hours and subsequently evaporated in vacuo to yield 10.9 g of brown grease which is dissolved in ethyl acetate and extracted with 2N HCl and water. The ethyl acetate solution is dried over sodium sulphate and subsequently evaporated to yield 8.1 g of light beige solidified foam; m.p. 103°–115°C. A sample is recrystallised 3 times from water. A small quantity of the yield is sent for analysis; m.p. 110°–115°C Calc. C 53.18%; H 4.46%; N 6.83%; Found. C 52.90%; H 3.83%; N 6.99%.

Example 26 1-(α-n-Hexylsuccinimido)-2-chloro-4-sulphamoyl-benzene 2.0 g of n-hexylsuccinic acid and 2.0 g of 3-chlorosulphanilamide are heated together in a boiling vessel via an oil bath, until no more water vapour can be distilled off. After cooling a brown grease remains which is dissolved in 100 ml of ethyl acetate and extracted twice each with 50 ml each of NaHCO$_3$ solution, 2N HCl and water. The ethyl acetate solution is subsequently filtered hot over activated carbon and dried over sodium sulphate. After distilling off the ethyl acetate the remaining oil has a yellowish colour. Dissolution in ether takes place, followed by filtering over activated carbon. The solution is 50 percent concentrated and accompanied by cooling in the CO$_2$ bath and the addition of petroleum ether the oil is crystallised.

Yield 0.5 g of snow white crystals; m.p. 126–130°C. Then recrystallised twice from ether in petroleum ether; m.p. 132°–135°C.

Calc. C 51.57%; H 5.70%; N 7.52%; Found. C 51.67%; H 5.70%; N 7.55%.

Example 27 1-(α-Phenylsuccinimido)-3-fluoro-4-sulphamoyl-benzene 5.0 g of 2-fluoro-4-aminosulphonamide and 5.1 g of phenylsuccinic acid are heated together for 3 hours at 190°C. The mixture is taken up in ethyl acetate and washed 3 times with 2N HCl, once with water, 3 times with 1N NaHCO$_3$, once with water, then subsequently extracted once with ethyl acetate, dried over Na$_2$SO$_4$, evaporated and crystallised from ethyl acetate- ether.

Yield 7.0 g m.p. 194°–198°C
Recrystallised from ethyl acetate-ether, m.p. 195°–198°C Calc. C 55.13%; H 3.76%; N 8.04%; Found. C 54.89%; H 3.88%; N 8.11%.

Example 28 1-(α-Cyclohex-2-enylsuccinimido)-2-chloro-4-sulphamoyl benzene 5.4 g of cyclohex-2-enylsuccinic anhydride and 6.2 g of 3-chloro-4-aminobenzene sulphonamide are heated together to 200°C. After cooling the mixture is dissolved in ethyl acetate and extracted with 2N HCl and 1N NaHCO$_3$, dried and evaporated. Yield 9.5 g of brown oil, which is dissolved in ethyl acetate, filtered over charcoal, mixed with petroleum ether, cooled and suction filtered to yield white crystals of m.p. 147°–150°C.

Recrystallised with ether/petroleum ether to yield white crystals; m.p. 151°–153°C.

Analysis
Calc. C 52.08%; H 4.64%; N 7.59%; Found C 52.15%; H 4.68%; N 7.66%.

Example 29 1-(α-Cyclopent-2-enylsuccinimido)-2-chloro-4-sulphamoyl benzene 5.0 g of cyclopent-2-enyl-succinic anhydride and 6.2 g of 3-chloro-4-aminobenzene sulphonamide are heated together at 240°C. After cooling the mixture is taken up in ethyl acetate, extracted with 2N HCl and 1N NaHCO$_3$, dried and evaporated.

Yield 7.5 g of brown foam product which is chromatographed in ethyl acetate on 150 g of neutral aluminium oxide in ethyl acetate; the ethyl acetate is evaporated.

Yield: a white foam product which cannot be crystallised A sample was sent for analysis Calc. C 50.75%; H 4.26%; N 7.89%; Found. C 50.78%; H 4.35%; N 7.94%.

Example 30 1-(α-Methylsuccinimido)-3-fluoro-4-sulphamoyl-benzene 4.0 g of 2-fluoro-4-aminobenzene sulphonamide and 4.0 g of 2-methyl-2-phenylsuccinic anhydride are heated together for 3 hours at 190°C, taken up in ethyl acetate and washed three times with 2N HCl, once with water, three times with 1N NaHCO$_3$ and again once with water, then subsequently extracted once with ethyl acetate, dried over Na$_2$SO$_4$, evaporated and crystallised from ethyl acetate - hexane (filtered through charcoal).

Yield 5.0 g; m.p. 178°–181°C
Recrystallised from ethyl acetate - hexane; m.p. 182°–184°C Calc. C 56.35%; H 4.18%; N 7.74%; Found. C 56.14%; H 4.27%; N 7.80%.

Example 31 1-(α-Phenylsuccinimido-3-chloro-4-sulphamoyl-benzene a. Preparation of 2-chloro-4-aminobenzene sulphonamide 1. 2-Chloro-4-nitroaniline is diazotised and converted into 2-chloro-4-nitrobenzene sulphochloride with SO$_2$/cuprous-chloride, which yields the sulphonamide by treatment with concentrated aqueous ammonia.

Yield: 73%, m.p. 144–148°C from hexane/ethyl acetate

2. By catalytic hydrogenation of 2-chloro-4-nitrobenzene sulphonamide in alcohol with palladium charcoal the 2-chloro-4-aminobenzene sulphonamide is obtained in 85% yield which crystallises from alchohol/water; m.p. 174°–176°C.

b. 6.0 g of 2-chloro-4-aminobenzene sulphonamide and 5.7 g of phenylsuccinic acid are heated together for 2 hours at 190°C, taken up in ethyl acetate, washed three times with 2N HCl, once with water, three times with 1N NaHCO$_3$ and once with water, back-extracted once with ethyl acetate, dried over Na$_2$SO$_4$, evaporated and crystallised from ethyl acetate-ether-hexane (filtered through charcoal).

Yield 1.8 g; m.p. 198°–214°C.
Boiled in 20 ml of methanol, well cooled and suction filtered
Yield 1.5 g; m.p. 221°–214°C
Recrystallised from methanol; m.p. 211°–214°C Calc. C 52.68%; H 3.59%; N 7.69%; Found. C 52.28%; H 3.74%; N 7.62%.

Example 32  1-(α-Cyclopentylsuccinimido)-2-chloro-4-sulphamoyl benzene 3.5 g of (cyclopenten-2-yl)-succinimide-2-chloro-4-sulphonamide benzene are dissolved in 50 ml of methanol and 0.1 g of PtO$_2$ is added thereto. Hydrogenation duration 15 minutes: in theory 290 ml of H$_2$, in practice 280 ml. The catalyst is removed and the solvent evaporated. The residue is a foam product which cannot be crystallised. Sample of the foam is supplied for analysis.

Analysis
Calc. C 50.46%; H 4.80%; N 7.85%; Found. C 50.41%; H 4.85%; N 7.68%.

Example 33  1-(α-Allylsuccinimido)-2-chloro-4-sulphamoyl-benzene 5.6 g of allylsuccinic anhydride and 8.3 g of 3-chloro-4-aminobenzene sulphonamide are heated together to 200°C, kept at this temperature for 45 minutes, taken up in ethyl acetate, extracted with 2N HCl and 1N NaHCO$_3$, dried with ethyl acetate and evaporated. Yield 10.6 g of brown oil, which is dissolved in a large volume of ether, filtered, concentrated to 250 ml, cooled and the precipitate suction filtered to give white crystals; m.p. 141°–146°C. It is then recrystallised several times with ethyl acetate/petroleum ether over charcoal to give white crystals; m.p. 147°–149°C Analysis
Calc. C 47.46%; H 3.98%; N 8.52%; Found C 47.36%; H 3.99%; N 8.51%.

Example 34  1-(α-Methyl-α-phenylsuccinimido)-2-fluoro-4-(N-ethylsulphamoyl)-benzene 2.18 g of 3-fluoro-4-aminobenzene sulphonic acid ethylamide and 1.90 g of α-methyl-α-phenylsuccinic anhydride are heated together to 210°C, then dissolved in ethyl acetate and extracted with 2N HCl and 1N NaHCO$_3$, dried and evaporated. Yield 1.65 g of brown oil which is dissolved in ethyl acetate, filtered over charcoal and evaporated to yield a colourless resin.

Analysis
Calc. C 58.51%; H 4.91%; N 7.18%; Found. C 58.64%; H 4.97%; N 7.09%.

Example 35  1-(α-Methyl-α-phenylsuccinimido)-3-chloro-4-sulphamoyl benzene 5.5 g of 2-chloro-4-aminobenzene sulphonamide and 5.2 g of 3-methyl-3-phenylsuccinic anhydride are mixed and heated to 190°C, cooled after 3 hours and taken up in ethyl acetate. The solution is washed 3 times with 2N HCl, once with water, 3 times 1N NaHCO$_3$, once with water, twice with brine and back extracted once with ethyl acetate, dried over Na$_2$SO$_4$ and evaporated to yield 8.8 g of dark brown oil. It is crystallised from ethyl acetate - hexane to give 3.8 g; m.p. 196°–202°C and recrystallised from ethyl acetate - hexane; m.p. 198°–202°C Analysis
Calc. C 53.94%; H 4.00%; N 7.40%; Found. C 53.91%; H 4.08%; N 7.93%.

Example 36  1-(α-Methyl-α-phenylsuccinimido)-2-chloro-5-sulphamoyl benzene 1.0 g of 3-amino-4-chlorobenzene sulphonamide and 0.95 g of α-phenyl-α-methylsuccinic anhydride are heated together to 210°C, then dissolved in ethyl acetate, extracted with 2N HCl and 1N NaHCO$_3$, dried with ethyl acetate, filtered over charcoal, crystallised with ether/petroleum ether, cooled and the precipitate suction filtered. Yield 1.0 g of white crystals; m.p. 95°–110°C which are recrystallised with acetone/ether-petroleum ether to yield white crystals; m.p. 93°–95°C.

Analysis
Calc. C 53.87%; H 3.99%; N 7.39%; Found. C 53.69%; H 4.30%; N 7.14%.

Example 37  1-(α-Methyl-α-phenylsuccinimido)-2-fluoro-4-(N-acetyl-sulphamoyl)-benzene 3.6 g of 3-fluoro-4-(α-methyl-α-phenylsuccinimide)-4-sulphamoyl-benzene and 1.6 g of pyridine (2 mol) are refluxed for 2 hours with 15 ml of acetic anhydride, and evaporated in vacuo. The brown oil is taken up in ethyl acetate, extracted with 2N HCl, dried and chromatographed neutral over 60 g neutral alumina. The ethyl acetate solutions are then concentrated somewhat and filtered over charcoal, crystallised with the addition of ether/petroleum ether and suction filtered to yield white crystals; m.p. 134°–136°C, then recrystallised again with ethyl acetate/ether-petroleum ether to yield white crystals; m.p. 135°–136°C Analysis
Calc. C 56.48%; H 4.74%; N 6.93%; Found. C 56.27%; H 4.41%; N 7.16%.

Example 38  1-(α-Metnyl-α-ethylsuccinimido)-3-fluoro-4-sulphamoyl benzene 3.7 g of α-methyl-α-ethylsuccinic anhydride and 4.9 g of 2-fluoro-4-aminobenzene sulphonamide are heated together for 90 minutes at 180°–190°C, then taken up in ethyl acetate, extracted with 2N HCl and 1N NaHCO$_3$, dried and evaporated. The residue is crystallised from acetone/petroleum ether to yield 4.3 g of white crystals; m.p. 134°–140°C and then recrystallised from acetone/petroleum ether to yield white crystals; m.p. 141°–143°C Analysis
Calc. C 49.72%; H 4.82%; N 8.92%; Found. C 49.70%; H 4.97%; N 8.56%.

Example 39  1-(α-Methyl-α-ethylsuccinimido)-3-chloro-4-sulphamoyl-benzene 4.3 g of 2-chloro-4-aminobenzene sulphonamide and 3.0 g of 3-methyl-3-ethylsuccinic anhydride are mixed and heated for 1½ hours at 200°C, cooled and taken up in ethyl acetate, washed three times with 2N HCl, once with water, three times with 1N NaHCO$_3$, once again with water, twice with brine, back-extracted once with ethyl acetate, dried over Na$_2$SO$_4$ and evaporated to yield 6.95 g of brown oil which is filtered through charcoal in ethyl acetate-hexane and crystallised to yield 4.7 g; m.p. 134°–140°C, recrystallised from ethyl acetate-hexane to yield 4.3 g; m.p. 154°–164°C. Recrystallised from ethyl acetate-hexane; m.p. 154°–164°C.
Analysis
Calc. C 47.19%; H 4.57%; N 8.47%; Found C 46.94%; H 4.52%; N 8.39%.
Example 40 1-($\alpha$-Methyl-$\alpha$-ethylsuccinimido)-2-fluoro-4-(N-ethylsulphamoyl)-benzene 2.18 g of 3-fluoro-4-aminobenzene sulphonic acid ethyl amide and 1.42 g of $\alpha$-methyl-$\alpha$-ethylsuccinic anhydride are heated together to 210°C, kept at this temperature for 30 minutes, taken up in ethyl acetate, extracted with 2N HCl and 1N NaHCO₃, dried and evaporated to yield 3.3 g of brown oil. This is mixed with 50 ml of water, refluxed for 30 minutes and extracted with ether, the ether solution being washed with 1N NaHCO₃, dried and evaporated to yield a yellow oil which can be crystallised with ether/petroleum ether to yield white crystals; m.p. 102°–104°C
Analysis
Calc. C 52.68%; H 5.60%; N 8.19%; Found. C 53.00%; H 5.85%; N 7.94%.
Example 41 1-($\alpha$-Cyclohexylsuccinimido)-2-chloro-4-sulphamoyl-benzene 2.8 g of (cyclohexen-2-yl)-succinimide-2-chlorobenzene-4-sulphonamide are dissolved in 50 ml of methanol, 0.1 g of PtO₂ is added thereto and hydrogen passed in for 10 minutes, the uptake being in theory 185 ml of H₂, in practice 190 ml. The catalyst is then removed, the solvent evaporated, the residue dissolved in ether and precipitated with petroleum ether and the preceipitate suction filtered to yield white crystals of m.p. 159°–170°C.

These are dissolved in tetrahydrofuran-ether, filtered over charcoal, mixed with petroleum ether and the precipitate suction filtered to yield white crystals, m.p. 168°–170°C
Analysis
Calc. C 51.80%; H 5.16%; N 7.55%; Found C 51.90%; H 5.23%; N 7.55%.

I claim:
1. The compound 1-($\alpha$-methyl-$\alpha$-phenylsuccinimido)-2-fluoro-4-sulphamoyl-benzene.
2. The compound 1-($\alpha$-phenyl-succinimido)-2-chloro-4-sulphamoyl-benzene.
3. The compound 1-($\alpha$-phenyl-succinimido)-2-sulphamoyl-benzene.
4. The compound 1-($\alpha$-phenyl-succinimido)-3-fluoro-4-sulphamoyl-benzene.

* * * * *